(12) United States Patent
Braun et al.

(10) Patent No.: US 10,502,361 B2
(45) Date of Patent: Dec. 10, 2019

(54) ADJUSTABLE BRACKET FOR ACCESSORY ATTACHMENT ON STRUT

(71) Applicant: Club Car, LLC, Evans, GA (US)

(72) Inventors: Benjamin Gilling Braun, Evans, GA (US); William David Reeves, Jr., Grovetown, GA (US); Lydell Delmart Walker, Augusta, GA (US); Tam Thanh Mai, Martinez, GA (US); John Wiley Jasmin, Aiken, SC (US)

(73) Assignee: Club Car, LLC, Evans, GA (US)

( * ) Notice: Subject to any disclaimer, the term of this patent is extended or adjusted under 35 U.S.C. 154(b) by 146 days.

(21) Appl. No.: 15/701,045

(22) Filed: Sep. 11, 2017

(65) Prior Publication Data
US 2019/0078730 A1 Mar. 14, 2019

(51) Int. Cl.
*F16M 13/02* (2006.01)
*B60R 1/06* (2006.01)
*B60R 1/078* (2006.01)

(52) U.S. Cl.
CPC ............. *F16M 13/02* (2013.01); *B60R 1/06* (2013.01); *B60R 1/078* (2013.01); *F16M 13/022* (2013.01)

(58) Field of Classification Search
CPC ........ F16M 13/02; F16M 13/022; B60R 1/06; B60R 1/078
USPC ................................. 296/1.11, 78.1
See application file for complete search history.

(56) References Cited

U.S. PATENT DOCUMENTS

| | | | |
|---|---|---|---|
| 3,258,822 A * | 7/1966 | Schlesch | F16L 41/06 138/99 |
| 3,371,903 A | 3/1968 | Thompson | |
| 4,029,276 A * | 6/1977 | Zielie | F16L 3/10 248/74.1 |
| 4,077,597 A | 3/1978 | Greig | |
| 4,545,640 A * | 10/1985 | Buchberger | H01R 4/36 439/811 |
| 4,895,338 A * | 1/1990 | Froutzis | B60N 2/01516 248/503.1 |
| 5,082,361 A | 1/1992 | McKee | |
| 5,516,073 A | 5/1996 | McMahan | |
| 5,880,895 A | 3/1999 | Lang et al. | |
| 6,196,614 B1 * | 3/2001 | Willey | B62J 17/04 296/78.1 |
| 6,764,056 B1 * | 7/2004 | Wu | B60R 1/06 248/479 |

(Continued)

OTHER PUBLICATIONS

Dennis Kirk Web Page "Kolpin Universal Side UTV Mirrors—98315", archived by the Wayback Machine website on Sep. 24, 2016, pp. 1 and 2.*

*Primary Examiner* — Jason S Morrow
(74) *Attorney, Agent, or Firm* — Taft Stettinius & Hollister LLP

(57) ABSTRACT

A bracket for attaching an accessory to a strut on a personal utility vehicle includes first and second bracket members. A slot is formed in the first end of the first bracket member and an insert is formed adjacent a first end of the second bracket member. The insert and slot are configured to lockingly connect the first ends of the first and second bracket members together. First and second flanges extending from the second end of the first and second bracket members, respectively are configured to be fastened together and clamp the bracket about an outer perimeter wall of the strut after the insert is engaged with the slot.

24 Claims, 7 Drawing Sheets

(56) References Cited

U.S. PATENT DOCUMENTS

| | | | |
|---|---|---|---|
| 7,150,438 B2* | 12/2006 | Schaty | F16L 3/1008 |
| | | | 248/74.1 |
| 7,753,430 B1* | 7/2010 | Elgin | B62J 17/06 |
| | | | 296/180.1 |
| 2002/0074820 A1* | 6/2002 | Gagne | B60J 1/04 |
| | | | 296/92 |
| 2002/0080506 A1 | 6/2002 | Lang et al. | |
| 2010/0219305 A1 | 9/2010 | Lloyd et al. | |
| 2012/0307387 A1 | 12/2012 | Lang et al. | |

* cited by examiner

ADJUSTABLE BRACKET FOR ACCESSORY ATTACHMENT ON STRUT

TECHNICAL FIELD

The present application generally relates to a unique bracket and more particularly, but not exclusively, to an adjustable bracket configured to attach an accessory to a strut on a personal transport vehicle.

BACKGROUND

Personal transport vehicles such as golf carts, all-terrain vehicles, utility vehicles or the like can include struts made from tube members that extend from a base frame to a top or roof of the vehicle. In some embodiments electrical wires may be inserted through the struts at various locations which can prevent drilling and/or attachment of accessories to the struts with threaded fasteners or the like. Some existing systems have various shortcomings relative to certain applications. Accordingly, there remains a need for further contributions in this area of technology.

SUMMARY

One embodiment of the present invention is a unique bracket system. Other embodiments include apparatuses, systems, devices, hardware, methods, and combinations for attaching an accessory to a strut on a utility vehicle. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
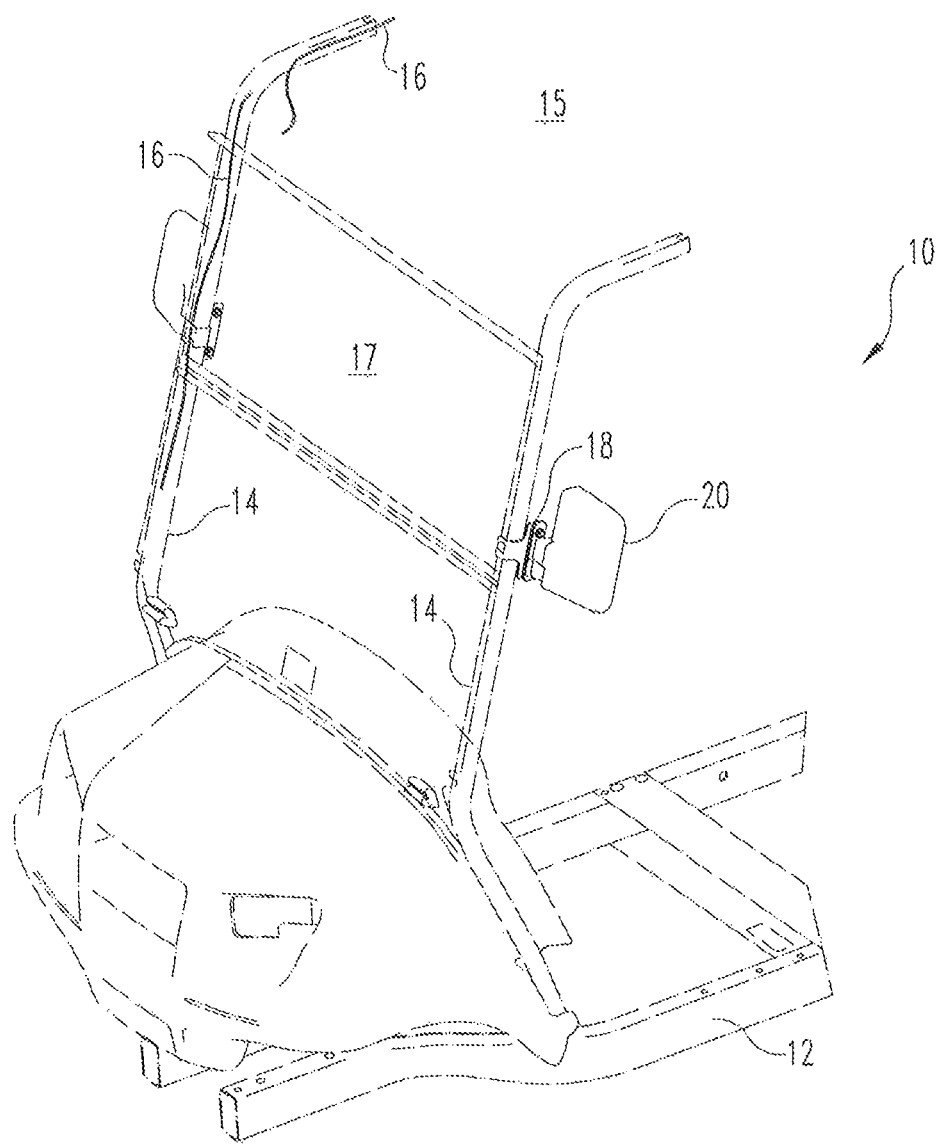
FIG. 1 is a partial perspective view of a portion of a personal utility vehicle with an adjustable bracket assembly according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring now to FIG. 1, a portion of a personal utility vehicle 10 is illustrated in phantom line. Many of the typical features of a utility vehicle 10 such as a motive source, frame, seats and wheels, etc., which would be known to one skilled in the art are not shown. The utility vehicle 10 includes one or more struts 14 extending from a chassis 12 to connect to a top structure 15 and/or to other components such as a windshield 17. In some forms, the struts 14 may be hollow so as to permit electrical wires 16 or the like to be placed therein.

A bracket 18 is connectable to the struts 14 so as to releasably hold an accessory 20 such as a mirror, light or similar components to the strut 14. The bracket 18 is configured to couple with the strut 14 through a friction clamp fit. In this manner, the hollow struts 14 need not have holes drilled through sidewalls thereof and thus eliminate the chance for potential damage to electrical wires 16 positioned therewithin. One or more brackets 18 can be positioned anywhere along a length of the strut 14 as desired.

Figure 2:
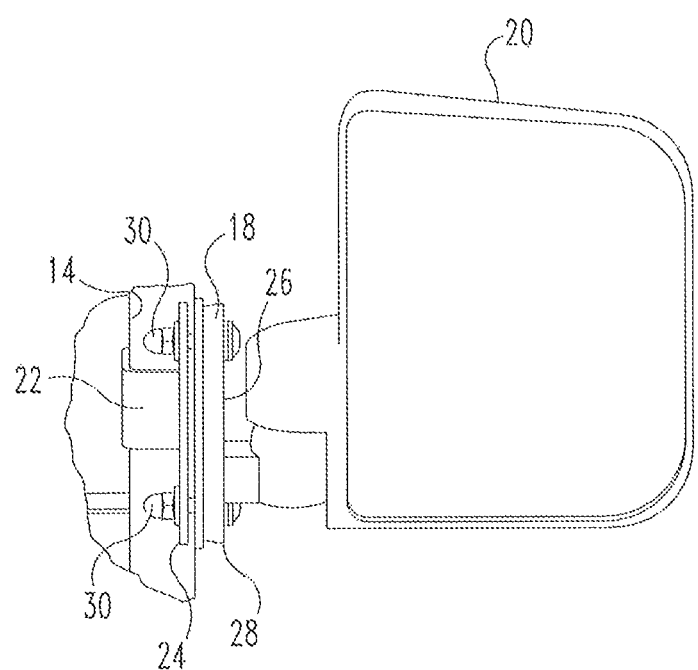
FIG. 2 is an enlarged front elevated view of the bracket assembly of FIG. 1.

Referring now to FIG. 2, an enlarged portion of the bracket 18 and accessory feature 20 is illustrated. The bracket 18 can be assembled and connected to the strut 14 by way of attaching a first bracket member 22 and a second bracket member 26 to one another after positioning the bracket members 22, 26 around the external walls of the strut 14. The first bracket member 22 includes a first flange 24 and the second bracket member 26 includes a second flange 28 that are releasably attached to one another via one or more fasteners 30.

Figure 3:
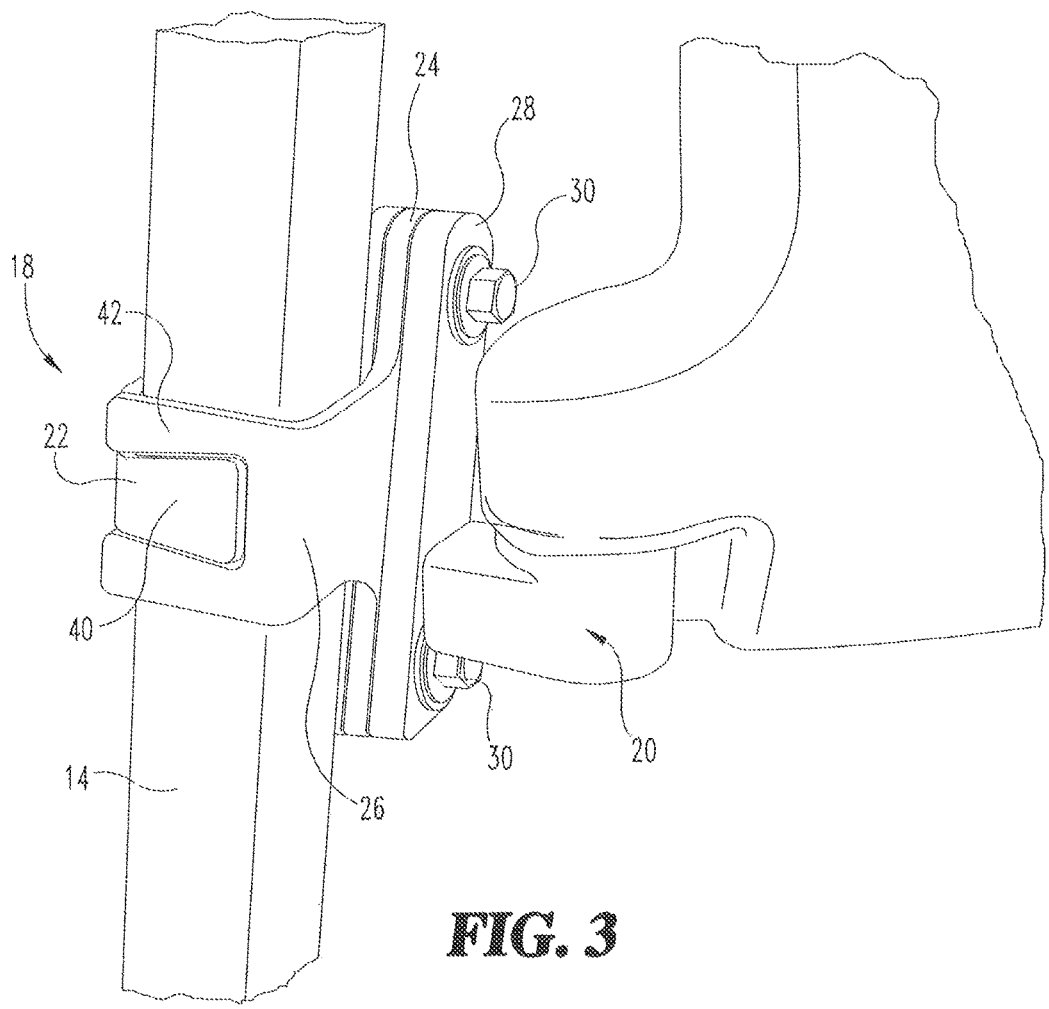
FIG. 3 is an enlarged perspective view of the bracket assembly of FIG. 1.

Referring now to FIG. 3, a perspective view of the bracket assembly 18 and accessory 20 is illustrated. The first bracket member 22 includes a first flange 24 extending from one end thereof and a dovetail coupler 40 extending from an opposing end. The second bracket member 26 includes a second flange 26 extending from one end and a dovetail slot coupler 42 extending from an opposing end thereof. The dovetail coupler 40 and the dovetail slot coupler 42 of the first and second bracket members 22, 26 are lockingly engaged to one another in such a way so as to prevent disassembly of the first and second bracket members 22, 26 when the flanges 24, 28 are coupled together with one or more fasteners 30. It should be noted that other mechanical coupling means such as a fir tree coupling design, square coupling or other configurations may be used in place of a dovetail coupler in other embodiments.

The bracket assembly 18 can be assembled to the strut by placing the first bracket member 22 around the strut 14 and subsequently sliding the second bracket member 26 over the first bracket member 22 such that the dovetail slot 42 is engaged with the dovetail coupler 40. In other forms, the bracket assembly 18 can be assembled by first placing the second bracket member 26 around the strut 14, and then attaching the first bracket member 22 thereto. The dovetail connection prevents the brackets 22, 26 from separating at a first end after the flanges 24, 28 are connected together via fastener(s) 30.

Figure 4A:
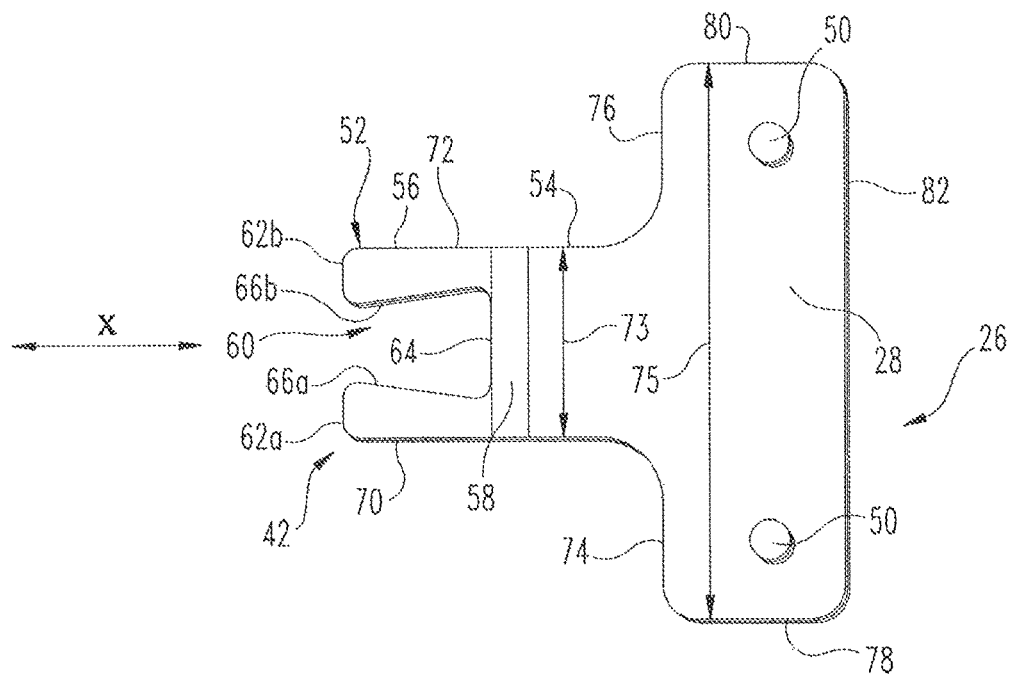
FIG. 4A is a top view of a flat pattern for a second bracket member.
Figure 4B:
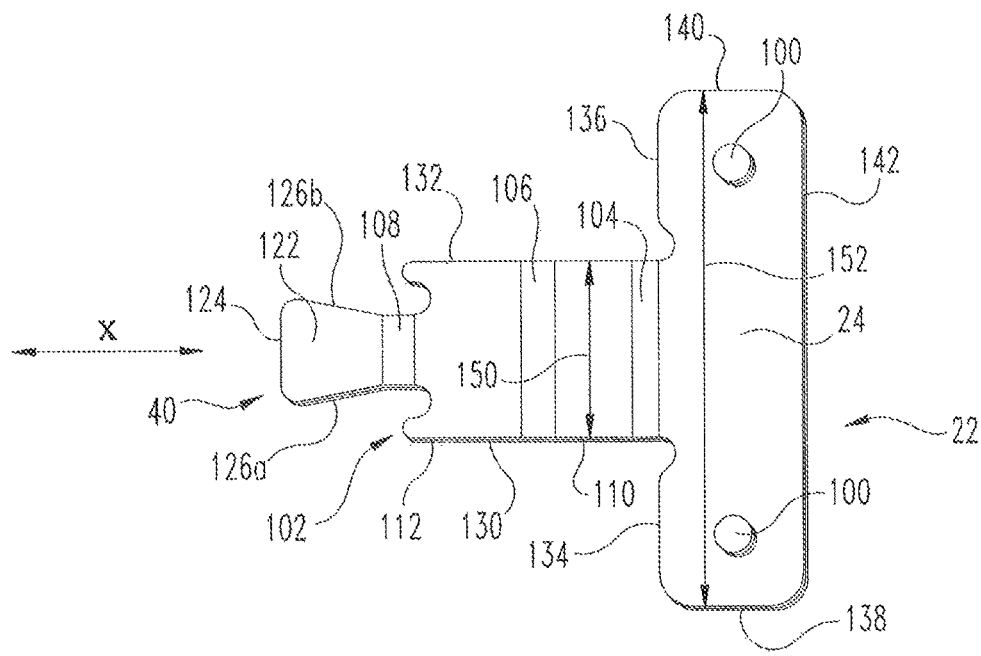
FIG. 4B is a top view of a flat pattern for a first bracket member.

Referring now to FIGS. 4A and 4B, plan views of a flat pattern for the first bracket member 22 and second bracket member 26 are illustrated. In some forms, the flat patterns are formed from substantially constant thickness plate material. In other forms, the plate material may have varying thicknesses therethroughout. The plate material may be made from metal, plastic, composite or combinations thereof. It should be noted that the dovetail or the dovetail slot may be formed on either of the bracket members 22, 26.

Referring specifically to FIG. 4A, the second bracket member 26 includes at least one through aperture 50 extending through the second flange 28. An extension arm 52 extends from the second flange 28 in a longitudinal direction defined by double arrow X. The extension arm 52 includes a first leg segment 54 and a second leg segment 56 with a bend region 58 formed between the first and second leg segments 54, 56. The second leg segment 56 includes the dovetail slot coupler 42 formed at a distal end of the extension arm 52, The dovetail slot coupler 42 includes a dovetail slot 60 defined by split forward walls 62a, 62b, an aft wall 64 and a pair of converging walls 66a, 66b extending between the aft wall 64 and the split forward walls 62a, 62b. The extension arm 52 is generally defined by first and second sides 70, 72 that can include a width 73 that is smaller than a width 75 of the second flange 28. In one form, the first and second sides 70, 72 of the extension arm 52 can be substantially parallel, however in other forms the first and second sides may not be parallel. A pair of shoulders 74, 76 extends outward from the side walls 70, 72 of the extension arm 52 to form a portion of the second flange 28. First and second side walls 78, 80 extend from the shoulders 74, 76 to an end wall 82 to define the second flange 28.

Referring now to FIG. 4B, the first bracket member 22 includes at least one through aperture 100 extending through the first flange 24. In the disclosed embodiment, two through apertures 100 corresponds to the through apertures 50 of the second flange 28 of the second bracket member 26. A fastener (not shown) may extend through the apertures 50, 100 and couple the flanges 24, 28 together. An extension arm 102 extends from the first flange 24 in a longitudinal direction defined by double arrow X, The extension arm 102 includes a first, bend region 104, a second bend region 106 and a third bend region 108. A first leg segment 110 is formed between the first and second bend regions 104, 106, respectively, and a second leg segment 112 is formed between the second and third bend regions 106 and 108. The dovetail coupler 40 extends from the third bend region 108 of the extension arm 102. The dovetail coupler 40 includes a dovetail 122 defined by a forward wall 124 with a pair of diverging walls 126a, 126b projecting from the third bend region 108 to the forward wall 124 of the dovetail 122. The extension arm 102 is further defined by first and second side walls 130, 132 extending away from the first flange 24. In one form, the first and second side walls 130, 132 can be substantially parallel and in other forms the first and second side walls may be non-parallel. A first shoulder 134 extends radially outward from the first side wall 130 to form a portion of the first flange 24. A second shoulder 136 extends radially outward from the second side wall 132 of the extension arm 102 to form another portion of the first flange 24. First and second side walls 138, 140 extend from the shoulders 134, 136 respectively, and terminate at an end wall 142 to define the first flange 24. A width 150 of the extension arm 102 can be smaller than a width 152 of the first flange 24.

Figure 5A:
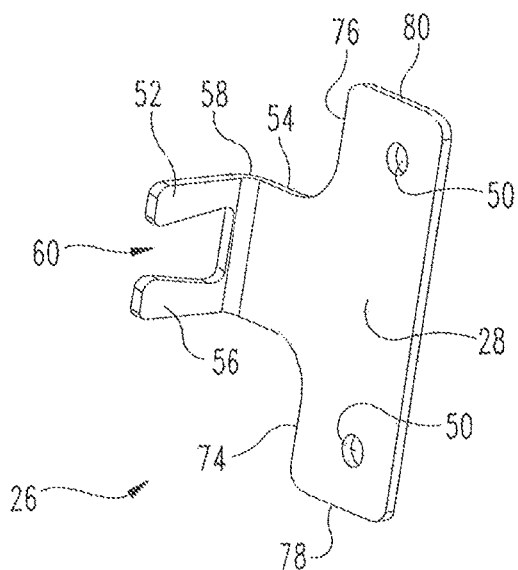
FIG. 5A is a perspective view of the second bracket member after bending the flat pattern of FIG. 4A.
Figure 5B:
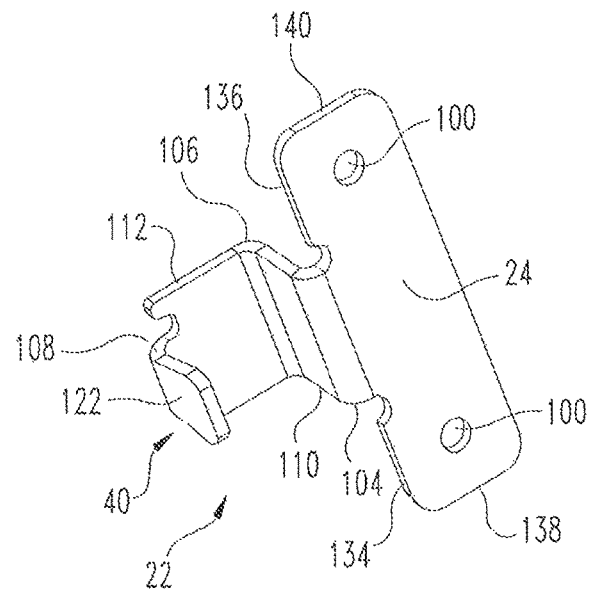
FIG. 5B is a perspective view of the first bracket member after bending the flat pattern of FIG. 4B.

Referring now to FIGS. 5A and 5B, are perspective views of the first and second bracket members 22, 26 after being formed into a final configuration from the flat pattern views of FIG. 4A and FIG. 4B. The feature callouts are the same as described with FIGS. 4A and 4B. In some forms the leg segments of the first and second bracket members 22, 26 may be substantially flat and linear. In other forms, the leg segments may have curvature to correspond with a shape of the strut 14.

Figure 6:
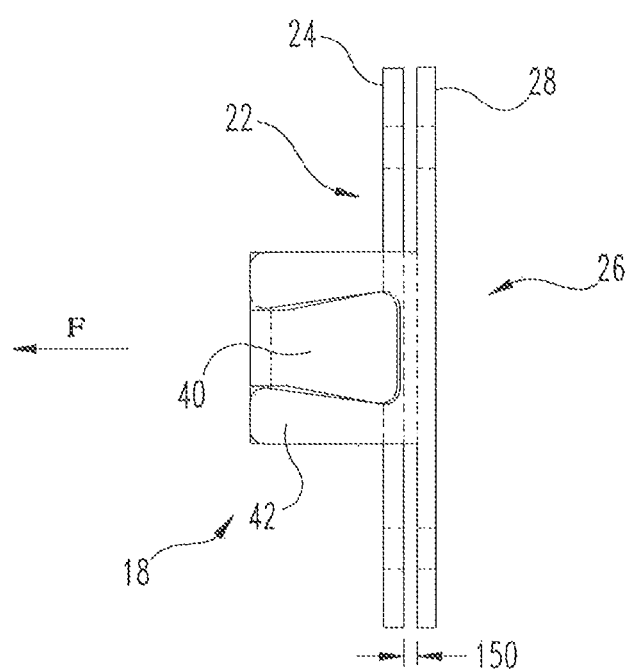
FIG. 6 is a front view of the first bracket member and second bracket member connected together with a dovetail connection joint.

Referring now to FIG. 6, the first and second brackets 22, 26 are illustrated such that the dovetail coupler 40 of the second bracket member 26 is engaged with the dovetail slot coupler 42 of the first bracket member 22. The first and second bracket members 22, 26 are configured such that when assembled with a strut 14 (see FIG. 7), a gap 150 will form between the first flange 24 and the second flange 28 in an unstressed state of the assembly. The gap 150 is defined such that the first flange 24 and second flange 28 will move toward one another when one or more fasteners (see FIG. 3) are tightened therebetween. The width of the gap 150 will be reduced and in some forms the flanges will directly engage one another at final assembly. In this manner, a locking force defined in the direction of arrow F acts through the dovetail coupler 40 and the dovetail slot coupler 42 to ensure that the dovetail and dovetail slot coupler 40, 42 remain lockingly engaged in the same axial plane. The result of locking the flange together at either end causes a friction press fit between bracket assembly 18 and the strut 14 to prevent relative movement therebetween.

Figure 7:
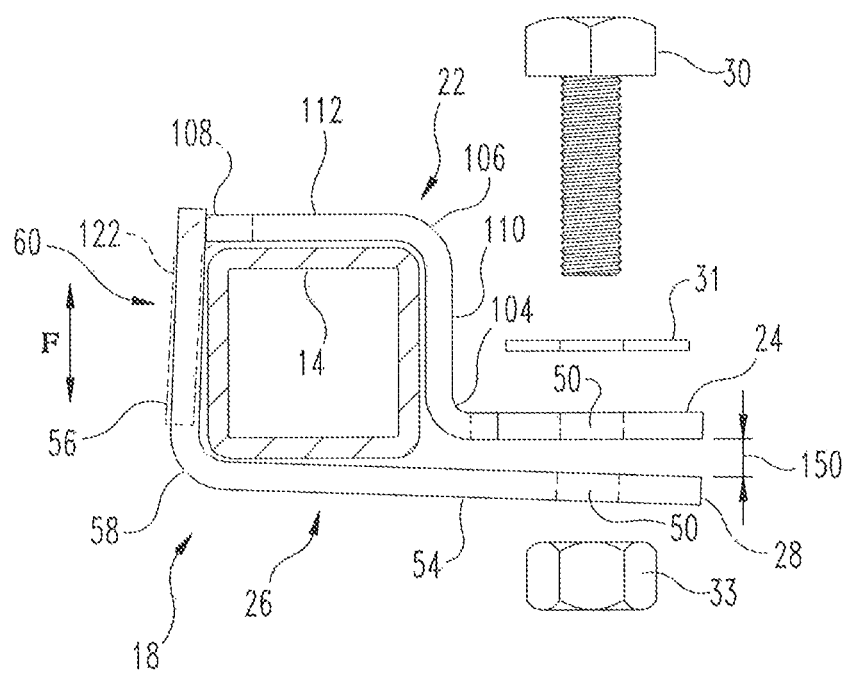
FIG. 7 is a top view of the bracket assembly and a cross-sectional view of a strut.

FIG. 7 illustrates a top view of the bracket assembly 18 and a cross-sectional view of the strut 14 in a partially assembled condition. It should be noted that the strut 14 includes is a substantially square cross-section in the exemplary embodiment, however other cross-sectional shapes may be employed with corresponding changes to segment lengths and bend locations in alternate forms of bracket members 22, 26. The first bracket member 22 includes a first flange 24 with a first bend region 104, a first leg segment 110 extending from the first bend region 104 to a second bend region 106, a second leg segment 112 positioned between the second bend region 106 and a third bend region 108, and a dovetail 122 extending from the third bend region 108.

The second bracket member 26 includes a flange 28 connected to a first leg segment 54 extending to a first bend region 58. A second leg segment 56 extends from the first bend region 58 and includes a dovetail slot 60 at the end thereof. The fastener 30 can include a washer 31 and a threaded nut 33 operable to tighten with the flanges 24, 28 as is conventional. It should be understood that other fastener types can be employed such as clips and springs or the like. In other forms, semi-permanent fixture means such as spot welding or the like can be employed to lock the flanges 24, 28 together. The lock force F is generated between the dovetail coupler 40 and the dovetail slot coupler 42 as the fastener 30 tightens against the flanges 24, 28. In this manner, the bracket assembly 18 is held in fixed position with the strut 14 through a friction press fit.

In one aspect the present disclosure includes a bracket comprising a first bracket member including a first flange extending from a first end and a dovetail slot coupler extending from an opposing second end thereof; a second bracket member including a second flange extending from a first end and a dovetail coupler extending from an opposing second end thereof; and wherein the dovetail coupler and the dovetail slot coupler are configured to lockingly connect the second ends of the first and second bracket members together after the first and second flanges are fastened together.

In refining aspects, the first and second flanges are defined by an elongate width extending between first and second ends and a length extending between first and second sides, the width being greater than the length; the first and second flanges of the first and second bracket members each include a through hole configured to receive a fastener therethrough; each bracket member further comprises an extension arm extending from each of the first and second flanges and wherein one of the dovetail slot coupler and the dovetail coupler is connected to a distal end of one of the extensions arms; the extension arms are further defined by a width that is smaller than a width of the flange; the first and second bracket members are formed from a flat plate having a substantially constant thickness; the plate is formed from one of a metal, a composite, a plastic or combinations thereof; the first and second bracket members include a plurality of leg segments with a bend formed between each pair of adjacent leg segments; each bend is approximately ninety degrees (90°); one of the first and second bracket members include two leg segments and the other of the first and second bracket members include three leg segments; each of the leg segments of the first and second bracket members engage with an outer wall of a strut when the bracket members are fastened together about the strut; one of the bracket members include linear leg segments that engage with two walls of a four sided strut and the other of the bracket members include linear leg segments that engage with three walls of the four sided strut when assembled therewith; a gap is formed between the flanges of the first and second bracket members when connected about a strut prior to fastening the flanges together.

In another aspect the present disclosure includes a method for attaching an accessory to a strut comprising assembling a first bracket member and a second bracket member to outer walls of a strut; connecting a first end of the first and second bracket members together with a locking tongue and groove mechanism; connecting a second end of the first and second bracket members together with a fastener; and wherein the second end of the first and second bracket members are spaced apart from one another after the first and second bracket members are assembled with the strut and prior to connecting the second ends together.

In refining aspects, forming one of the first and second bracket members with three leg segments and a curved portion disposed between each adjacent pair of leg segments; and forming the other of the first and second bracket members with two leg segments and a curved portion disposed between the two leg segments; forming one of the first and second bracket members with at least one arcuate segment; and wherein the strut includes a curved wall portion substantially corresponding with the arcuate segment of the bracket member; coupling the first and second bracket members to the strut at desired location with a friction clamp load generated by drawing the second ends of the bracket members together with a fastener and locking the first ends together with the tongue and groove mechanism.

In another aspect the present disclosure includes a personal utility vehicle comprising a chassis having a strut extending therefrom; a bracket connectable to the strut, the bracket comprising first and second bracket members, each bracket member having first and second ends; a slot formed in the first end of the first bracket member; an insert extending from a first end of the second bracket member, the insert configured to engage within the slot of the first bracket member to lock the first ends of the first and second bracket members together; a first flange extending from the second end of the first bracket member; a second flange extending from the second end of the second bracket member, the first and second flanges configured to be fastened together and clamp the bracket about an outer perimeter wall of the strut after the insert is engaged with the slot; and an accessory attached to the bracket.

In refining aspects, the strut includes an internal hollow portion; one or more conducting wires positioned within the hollow portion of the strut; the strut is a four sided structure; the insert and slot form a fixed joint adjacent one side of the strut and the first and second flanges are connected on another side of the strut; the accessory includes a mirror and/or a light; the bracket is clamped to the strut at any one of a plurality of locations along a length thereof; the insert and slot are formed as male and female portions of a dovetail joint; the first and second flanges include corresponding through holes configured to receive a fastener for clamping the first and second flanges together; the insert is prevented from disengagement from the slot after the bracket is positioned about the strut and the first and second flanges are fastened together.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not, be necessary and embodiments lacking the same may be contemplated as within the scope of the invention, the scope being defined by the claims that follow, reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A bracket comprising:
   a first bracket member including a first flange extending from a first end and a dovetail slot coupler extending from an opposing second end thereof;
   a second bracket member including a second flange extending from a first end and a dovetail coupler extending from an opposing second end thereof; and
   wherein the dovetail coupler and the dovetail slot coupler are configured to lockingly connect the second ends of the first and second bracket members together after the first and second flanges are fastened together;
   wherein each of the first and second bracket members include a plurality of leg segments with a bend formed between each pair of adjacent leg segments; and
   wherein one of the first and second bracket members include two leg segments and the other of the first and second bracket members include three leg segments.

2. The bracket of claim 1, wherein the first and second flanges are defined by an elongate width extending between first and second ends and a length extending between first and second sides, the width being greater than the length.

3. The bracket of claim 2, wherein the first and second flanges of the first and second bracket members each include a through hole configured to receive a fastener therethrough.

4. The bracket of claim 1, wherein each bracket member further comprises an extension arm extending from each of the first and second flanges and wherein one of the dovetail slot coupler and the dovetail coupler is connected to a distal end of one of the extensions arms.

5. The bracket of claim 4, wherein the extension arms are further defined by a width that is smaller than a width of the flange.

6. The bracket of claim 1, wherein the first and second bracket members are formed from a flat plate having a substantially constant thickness.

7. The bracket of claim 6, wherein the plate is formed from one of a metal, a composite, a plastic or combinations thereof.

8. The bracket of claim 1, wherein each bend is approximately ninety degrees (90°).

9. The bracket of claim 1, wherein each of the leg segments of the first and second bracket members engage with an outer wall of a strut when the bracket members are fastened together about the strut.

10. The bracket of claim 9, wherein one of the bracket members include linear leg segments that engage with two walls of a four sided strut and the other of the bracket members include linear leg segments that engage with three walls of the four sided strut when assembled therewith.

11. The bracket of claim 1, wherein a gap is formed between the flanges of the first and second bracket members when connected about a strut prior to fastening the flanges together.

12. A method for attaching an accessory to a strut comprising:
    assembling a first bracket member and a second bracket member to outer walls of a strut;
    connecting a first end of the first and second bracket members together with a locking tongue and groove mechanism;
    connecting a second end of the first and second bracket members together with a fastener; and
    wherein the second end of the first and second bracket members are spaced apart from one another after the first and second bracket members are assembled with the strut and prior to connecting the second ends together;
    forming one of the first and second bracket members with three leg segments and a curved portion disposed between each adjacent pair of leg segments; and
    forming the other of the first and second bracket members with two leg segments and a curved portion disposed between the two leg segments.

13. The method of claim 12 further comprising:
    forming one of the first and second bracket members with at least one arcuate segment; and
    wherein the strut includes a curved wall portion substantially corresponding with the arcuate segment of the bracket member.

14. The method of claim 12 further comprising:
    coupling the first and second bracket members to the strut at desired location with a friction clamp load generated by drawing the second ends of the bracket members together with a fastener and locking the first ends together with the tongue and groove mechanism.

15. A personal utility vehicle comprising:
    a chassis having a strut extending therefrom;
    a bracket connectable to the strut, the bracket comprising:
    first and second bracket members, each bracket member having first and second ends;
    a slot formed in the first end of the first bracket member;
    an insert extending from a first end of the second bracket member, the insert configured to engage within the slot of the first bracket member to lock the first ends of the first and second bracket members together;
    a first flange extending from the second end of the first bracket member;
    a second flange extending from the second end of the second bracket member, the first and second flanges configured to be fastened together and clamp the bracket about an outer perimeter wall of the strut after the insert is engaged with the slot; and
    an accessory attached to the bracket;
    wherein each of the first and second bracket members include a plurality of leg segments with a bend formed between each pair of adjacent leg segments; and
    wherein one of the first and second bracket members include two leg segments and the other of the first and second bracket members include three leg segments.

16. The vehicle of claim 15, wherein the strut includes an internal hollow portion.

17. The vehicle of claim 16, further comprising one or more conducting wires positioned within the hollow portion of the strut.

18. The vehicle of claim 15, wherein the strut is a four sided structure.

19. The vehicle of claim 18, wherein the insert and slot form a fixed joint adjacent one side of the strut and the first and second flanges are connected on another side of the strut.

20. The vehicle of claim 15, wherein the accessory includes a mirror and/or a light.

21. The vehicle of claim 15, wherein the bracket is clamped to the strut at any one of a plurality of locations along a length thereof.

22. The vehicle of claim 15, wherein the insert and slot are formed as male and female portions of a dovetail joint.

23. The vehicle of claim 15, wherein the first and second flanges include corresponding through holes configured to receive a fastener for clamping the first and second flanges together.

24. The vehicle of claim 23, wherein the insert is prevented from disengagement from the slot after the bracket is positioned about the strut and the first and second flanges are fastened together.

* * * * *